Patented June 18, 1940

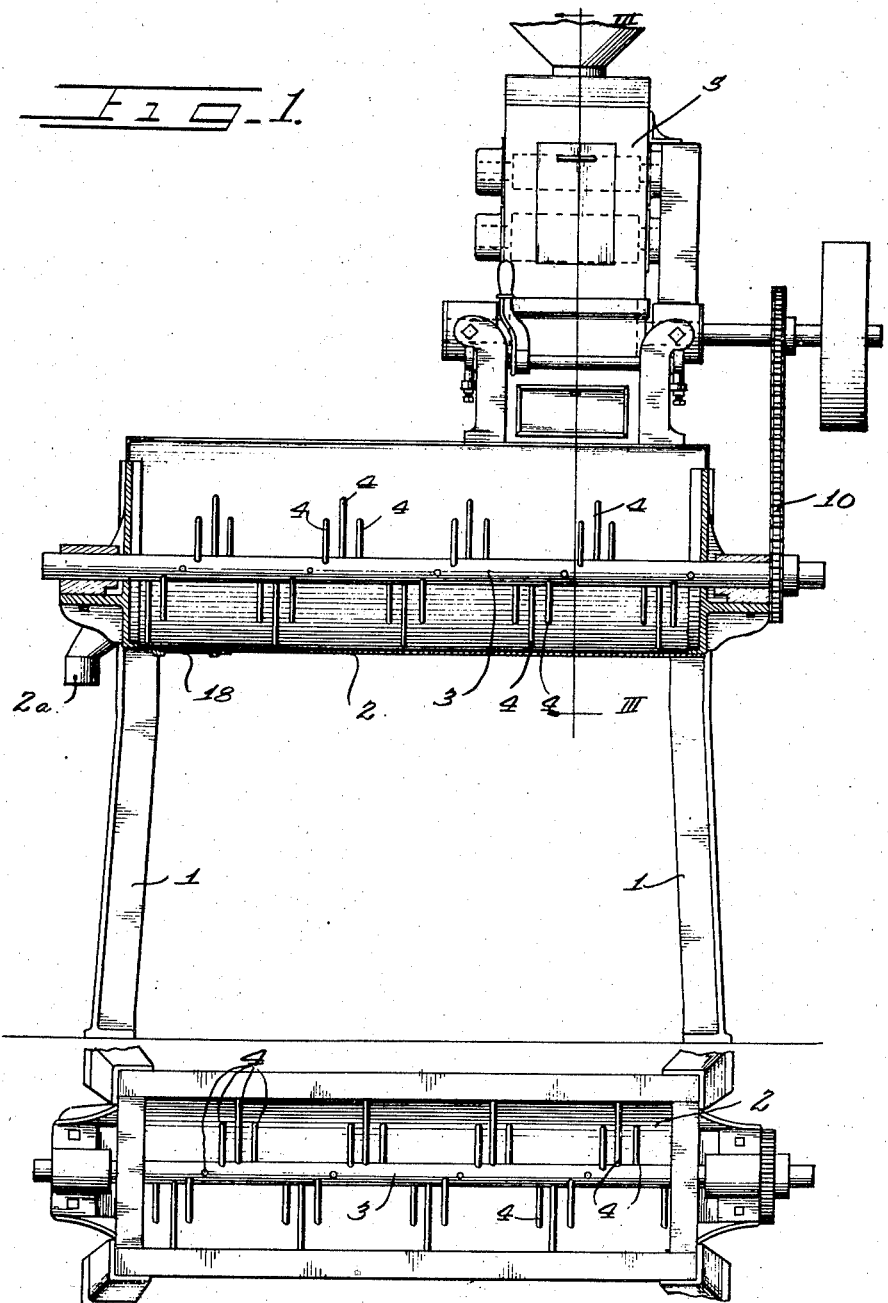

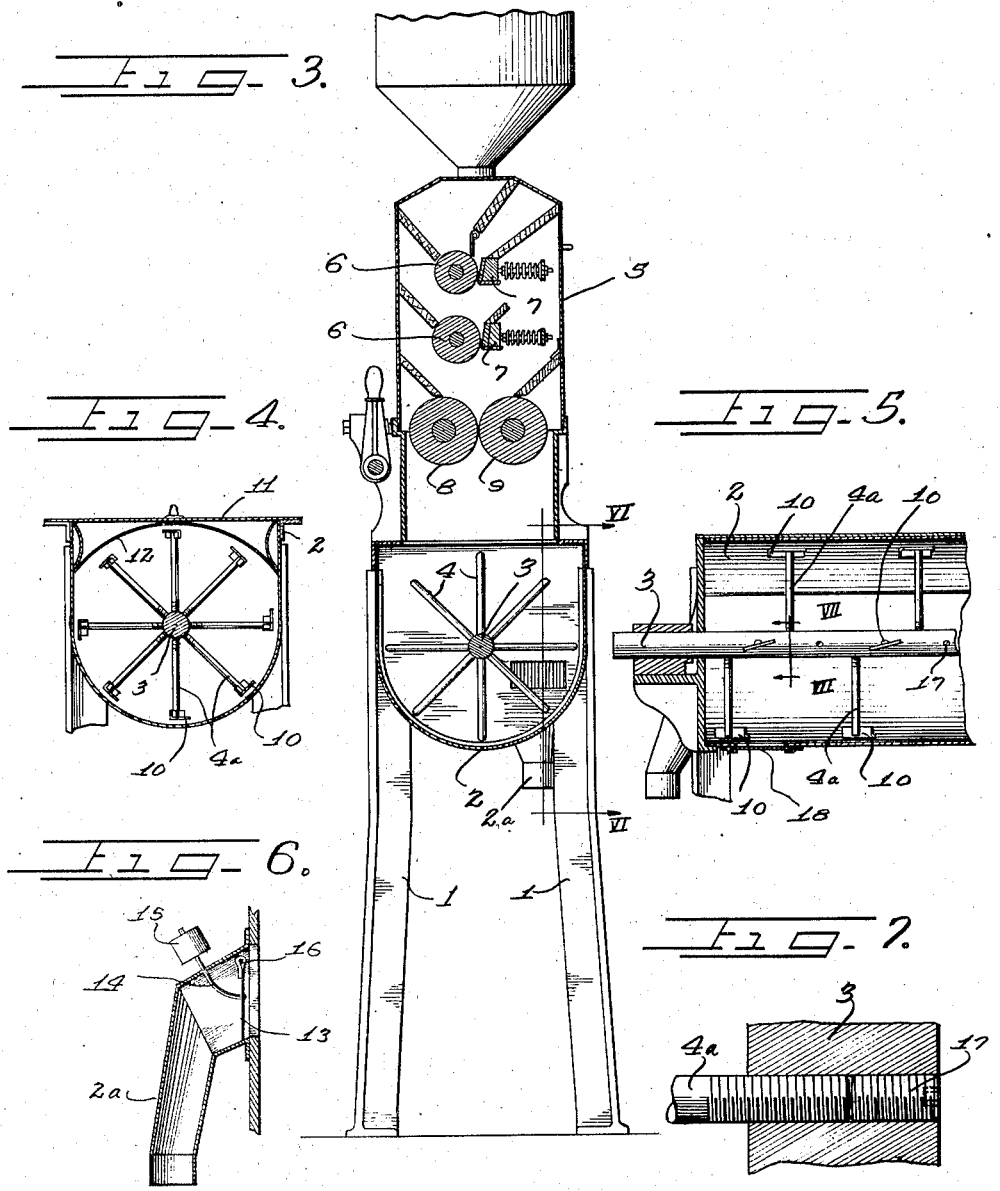

2,204,591

UNITED STATES PATENT OFFICE 2,204,591

APPARATUS FOR PREPARING GRANULAR COFFEE

Albert J. Hazle, Jr., Chicago, Ill., assignor to B. F. Gump Company, Chicago, Ill., a corporation of Illinois Application October 24, 1931, Serial No. 570,863

2 Claims. (Cl. 83—18)

This invention relates to a method and apparatus for preparing coffee.

At the present time, several methods are used for preparing the coffee bean. The first method, which involves the production of what is commonly known as steel cut coffee, consists in subjecting the coffee bean to the action of breaking down or cracking bars and corrugated rolls whereby the coffee bean is cut into granular pieces and the chaff is liberated in loose flakes which is removed and in some instances ground and returned to and mixed with the finished coffee. According to this first method, the tailings or coarse pieces are returned to the rolls for further granulation.

The second method involves the use of what are commonly known as plate mills which simultaneously crush and grind the coffee bean and chaff to a finer mass than the steel cut coffee. The crushed mass of coffee and chaff are in some instances passed thru a mixer for mixing the coffee and chaff, but the chaff is not thoroughly comminuted and is readily apparent in the finished product.

It has been discovered that if a mass of reduced coffee, with its chaff, is subjected to a rapid whipping or scouring action, the chaff will be completely comminuted and concealed in the reduced coffee so as to be practically invisible, and the finer products will become more thoroughly mixed with the coarser products resulting in a more even mixture. According to this invention, the coffee bean is first cracked and then granulated, preferably without materially grinding or crushing the chaff, although the method is also applicable to crushing or reducing means that also crushes the chaff. The mass of granulated, crushed or reduced coffee and chaff is next subjected to a scouring or whipping action which breaks up or comminutes the flakes of chaff into very fine particles and scours the particles of coffee and mixes the same with the chaff. This scouring or whipping action substantially conceals the comminuted chaff in the finished coffee so that the same is scarcely discernible by the naked eye. The apparatus for carrying out the method is preferably so constructed that the operation is not exposed to the atmosphere and the product loses substantially none of its aroma.

The invention comprises the novel method and apparatus hereinafter described and more particularly pointed out and defined in the appended claims.

In the accompanying drawings which illustrate a preferred form of apparatus for carrying out the method and in which similar reference numerals refer to similar features in the different views;

Figure 1 is a part elevational and part sectional view of an apparatus involving this invention for carrying out my novel process.

Figure 2 is a top plan view of the apparatus with parts removed.

Figure 3 is a sectional view taken upon the line III—III of Figure 1.

Figure 4 is a fragmentary cross sectional view through a modified form of apparatus.

Figure 5 is a fragmentary longitudinal sectional view through the modified form of apparatus.

Figure 6 is an enlarged sectional view taken upon the line VI—VI of Fig. 3.

Figure 7 is an enlarged sectional view taken upon the line VII—VII of Fig. 5.

The first step in my novel process consists in reducing the roasted coffee bean to fine particles. In so reducing the roasted bean, I may employ an apparatus that liberates the chaff in flakes, and that grinds very little thereof, or may use an apparatus that partly reduces or grinds the chaff. The next step resides in agitating, whipping or scouring the mass of fine coffee and chaff to comminute the chaff and mix the same with the coffee product so that the same becomes concealed in the finished coffee. The attrition between the particles of coffee and chaff through a sufficiently rapid whipping action will thoroughly comminute the chaff and reduce the larger particles of the coffee product so that a more uniform or even product is obtained. In the drawings, there is illustrated an apparatus which first cracks the roasted coffee bean, then granulates the same and in which most of the chaff is liberated in flakes and which agitates the granular mass and comminutes the chaff.

This apparatus consists of supporting legs or standards 1 upon which a cylindrical drum or casing 2 is mounted having a discharge spout 2ª at its outer end which communicates with the interior of the casing at a point above the bottom thereof as shown in Figure 3 so that an accumulation of the reduced mass may take place therein. Extending longitudinally through the casing and journalled in suitable bearings thereon is an agitating shaft 3 from which extend in radial directions agitating pin members 4 which are spaced spirally of the shaft about two inches apart. The shaft is adapted to be rotated at about 600 revolutions per minute for such a spacing.

While different spacing of the pins and a different speed of rotation of the agitating shaft may be used, it has been found that very satisfactory results are obtained by spacing the agitating pins about two inches apart spirally of the shaft and rotating the same at about 600 revolutions per minute so that the proper attrition between the particles of coffee and the particles of coffee and chaff may be attained for producing an even uniform mixture in which the chaff is thoroughly comminuted and concealed in the coffee product.

At the outlet of the drum 2 there is a door or gate 13 (Fig. 6) to which a curved stem 14 is attached that extends thru an aperture in the wall of the spout and that is equipped with a weight 15 at its outer end for urging the door toward its closed position and for applying a back pressure to the coffee mass. The door 13 is hinged upon a rod 16 at its upper margin. This gate will tend to restrict the flow of the finished product from the drum 2 and is automatically operable by the pressure of the advancing coffee mass to effect a controlled discharge of the coffee mass.

A granulating mill is mounted upon the drum 2 and discharges the granulated mass through the top of the drum 2 adjacent one end thereof. This granulating mill consists of a suitable and substantially airtight casing 5 in which are journalled a pair of vertically spaced corrugated cracker rolls 6 that cooperate with adjacent cracker bars 7 for breaking down the coffee beans. Below the cracker bars 7 there are a pair of cooperating granulating rolls 8 and 9. These rolls may be driven by any suitable mechanism. The agitating shaft 3 is preferably connected by sprocket gearing 10 to one of the shafts of the rolls 8 or 9.

In Figures 4 and 5 a modified form of agitating pin has been illustrated. This modified form of pin which is represented by the reference 4ª is provided with a blade 10 at its outer end which may be set at a suitable angle to the axis of the agitating rotor to convey and expedite the movement of the mass toward the outlet ar ˙ thuswise prevent heating of the mass more quickly and to more thoroughly clean out the cylinder of its coffee product. The stems 4ª are preferably threaded in the shaft 3 so that the blades can be adjusted to any desirable angle and at a suitable distance from the wall of the drum. A gauge plug 17 may be screwed in the shaft 3 opposite the end of each stem 4ª to regulate the effective lengths of such stems. The casing 2 of both modifications is adapted to be closed except directly under the mill 5 by a suitable cover or top. A cover 11 is shown in the Figure 4 modification as having an interior concave surface 12 to prevent the coffee product from lodging in the corner of the casing may be used to close the top of the casing.

A cleaning out outlet is provided in the bottom of the drum and this outlet is normally closed by a slide 18 which may be shifted or removed to uncover the outlet at the end of a run or when it is desired to clean out the drum so that the accumulations below the discharge gate may be readily removed.

In the operation of this apparatus, the coffee beans are put into the mill and are cracked by the two cracker rolls and bars and granulated by the rolls 8 and 9. Most of the chaff is liberated in flakes by these rolls and the combined granulated coffee and chaff descend into the agitating drum 2 in which the agitating shaft rotates at a high rate of speed. It will be noted that the mill 5 is positioned adjacent the end of the drum 2 which is remote from the spout 2ª with the result that the granular mass and chaff will travel through the drum towards the spout 2ª through which it will be discharged. The rapid rotation of the pins will cause the proper attrition of the particles of coffee and thoroughly comminute the chaff which is mixed with the coffee through a whipping and scouring action so that the chaff is practically concealed in the product that issues from the spout 2ª and a uniformly blended and mixed product is obtained. During this scouring or abrading action, it will be perceived that the advancing mass of coffee granules strikes or impinges against the under side of the cover or top on the agitating chamber 2. This cover is laterally offset with respect to the circular path of the coffee mass, and its under side or inner surface is not concentric with the agitating shaft 3. Also, this offset top extends longitudinally over a substantial part of the path through which the coffee is longitudinally advanced to the outlet door 13.

As a consequence of this arrangement, the liberated light chaff flakes strike the off-center inner surface of the top and are subjected to the abrading action of the advancing mass of coffee granules as these granules move past and impinge against said inner surface of the top, whereby the chaff is comminuted and rendered substantially invisible in the ensuing treated mass without substantially affecting the granular form of the coffee granules.

It will be appreciated that this method and apparatus eliminates the use of sieves, chaff removing means, chaff grinding means, and tailings conveyor that were heretofore necessary in making steel cut coffee.

I am aware that it is old to grind the coffee and chaff in a plate mill and in some instances pass the mass through a slow moving mixer to mix the chaff and ground coffee. Such mixers, however, do not produce the result of a rapidly rotating agitator in that there is very little tendency to comminute the chaff and scour and whip the particles of coffee due to the lack of a whipping action, nor is the chaff completely concealed by such a mixer which acts merely as a mixer and conveyor, and fails to produce the necessary attrition between the particles. The use of my agitator with such a plate mill will produce results that cannot be obtained by the mixers as now used. To obtain the best results, there should be a proper spacing of the agitating pins, and a proper high rate of speed, and the mass should move forward at the proper rate of speed. It has been found in practice that by spacing the pins as herein set forth and revolving the agitating shaft about 600 R. P. M., a very satisfactory product is obtained.

I am aware that changes and variations may be resorted to in both the method and apparatus and I therefore do not propose to limit this invention except as defined by the appended claims.

I claim as my invention:

1. In an apparatus for preparing coffee which has been reduced in a mill to a coffee mass comprising granules and substantial particles of light chaff, a mixing casing having a substantially imperforate bottom which is transversely circular throughout substantially half of its cross section and having a flat top section, said casing also having at one end an inlet opening adapted to be completely closed by a coffee reducing mill disposed thereover and having a discharge opening at its other end, and rotating means including a plurality of beating elements all of which rotate in unison in said casing for beating and advancing coffee discharged therein from said inlet, along the under side of said top section, toward said discharge opening, said rotating means having a rotary path the top of which is spaced from the top of said casing so that a chaff beating and abrading zone is provided between the flat top section and said rotary path into which said particles of liberated light chaff are adapted to be centrifugally thrown from said rotary path against said flat top section and to be subjected to the abrading action of the mass of coffee granules as such coffee mass is whirled through said path and past said zone, whereby said chaff is comminuted and rendered substantially invisible in the ensuing treated mass, while preserving the granular form of the coffee.

2. In an apparatus for preparing coffee which has been reduced in a mill to a coffee mass comprising granules and substantial particles of light chaff, a mixing casing having a substantially imperforate bottom which is transversely circular throughout substantially half of its cross section and having a flat top section, said casing also having at one end an inlet opening adapted to be completely closed by a coffee reducing mill disposed thereover and having a discharge opening at its other end, rotating means including a plurality of beating elements all of which rotate in unison in said casing for beating and advancing coffee discharged therein from said inlet, along the under side of said top section, toward said discharge opening, said rotating means having a rotary path the top of which is spaced from the top of said casing so that a chaff beating and abrading zone is provided between the flat top section and said rotary path into which said particles of liberated light chaff are adapted to be centrifugally thrown from said rotary path against said flat top section and to be subjected to the abrading action of the mass of coffee granules as such coffee mass is whirled through said path and past said zone, whereby said chaff is comminuted and rendered substantially invisible in the ensuing treated mass, while preserving the granular form of the coffee, and discharge control means associated with said opening for applying a back pressure to the coffee mass in said casing and automatically operable by the pressure of the advancing coffee mass to effect a controlled discharge of the coffee mass, as well as to aid in preventing liberated free chaff from floating or being thrown out of said discharge opening before being comminuted.

ALBERT J. HAZLE, JR.